(12) United States Patent
Profitt

(10) Patent No.: US 6,802,523 B1
(45) Date of Patent: Oct. 12, 2004

(54) SAFETY FASTENER FOR BALL AND SOCKET HITCH

(76) Inventor: Ronald E. Profitt, 1093 Rose Crossing, Kalispell, MT (US) 59901

( * ) Notice: Subject to any disclaimer, the term of this patent is extended or adjusted under 35 U.S.C. 154(b) by 0 days.

(21) Appl. No.: 10/696,315

(22) Filed: Oct. 29, 2003

(51) Int. Cl.$^7$ ................................................. B60D 1/28
(52) U.S. Cl. ........................................ 280/507; 280/432
(58) Field of Search ................................. 280/507, 432

(56) References Cited

U.S. PATENT DOCUMENTS

| | | | | |
|---|---|---|---|---|
| 2,485,743 A | * | 10/1949 | Koback | ........................ 280/501 |
| 5,236,215 A | * | 8/1993 | Wylie | ........................... 280/477 |
| 6,666,051 B1 | * | 12/2003 | Li | ................................... 70/14 |
| 6,694,781 B1 | * | 2/2004 | Li | ................................... 70/14 |
| 2003/0205884 A1 | * | 11/2003 | Koy | ............................. 280/507 |

* cited by examiner

Primary Examiner—Kevin Hurley
(74) Attorney, Agent, or Firm—Keith S. Bergman

(57) ABSTRACT

A safety fastener for ball and socket hitches of medium to heavy vehicles provides a base defining a channel to fit about a hitch tongue beam of a towing vehicle with holes in the base to receive the fastening bolt of a hitch ball to fasten the base and hitch ball on the hitch tongue. The base carries at least one collar for adjustable positioning of at least one vertical fastener arm by a pin fastener. The vertical fastener arm carries a horizontal fastening beam extending over the hitch beam carried by the ball to prevent removal of the hitch from the ball. Species provide one or two vertical fastening arms carrying the fastening beam. The pin fastener may carry a lock to prevent unauthorized removal of the hitch from the ball.

3 Claims, 6 Drawing Sheets

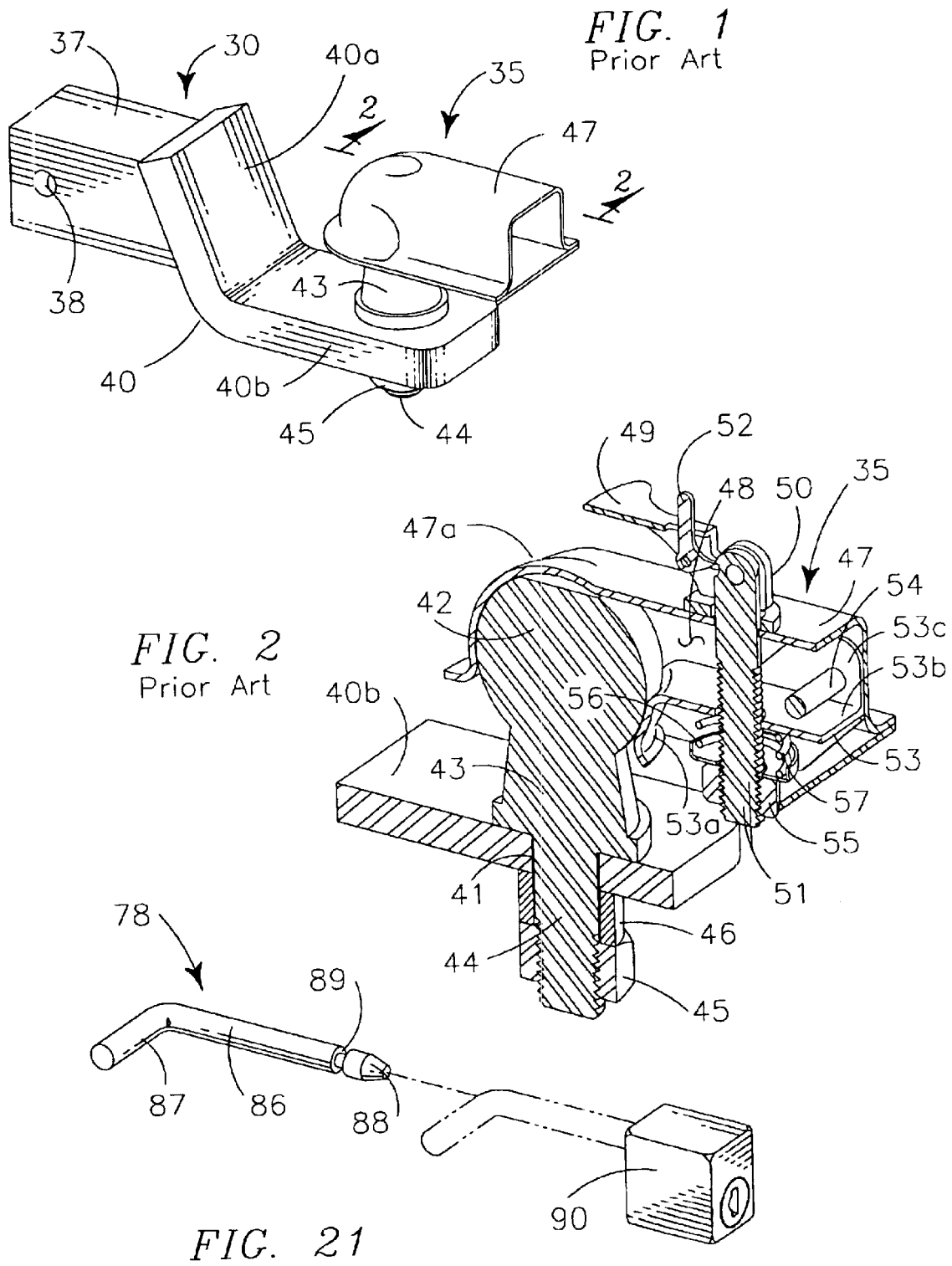

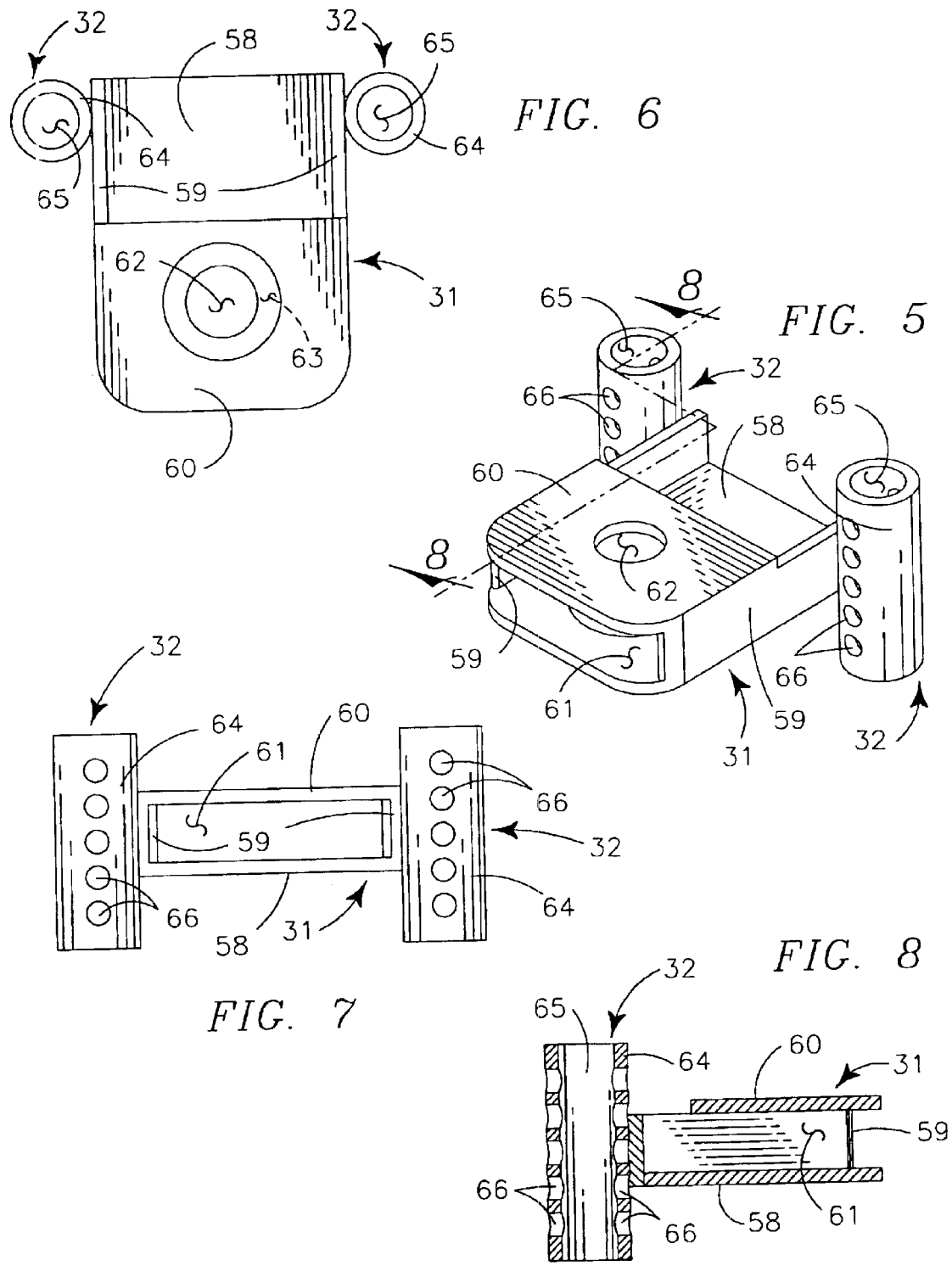

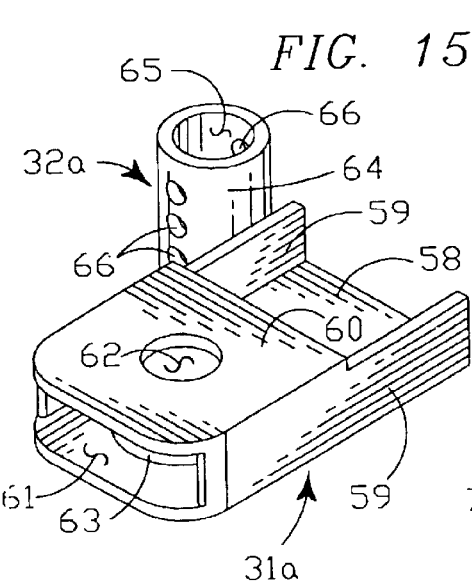
FIG. 15
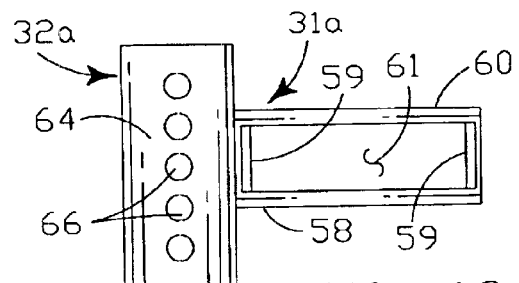
FIG. 16
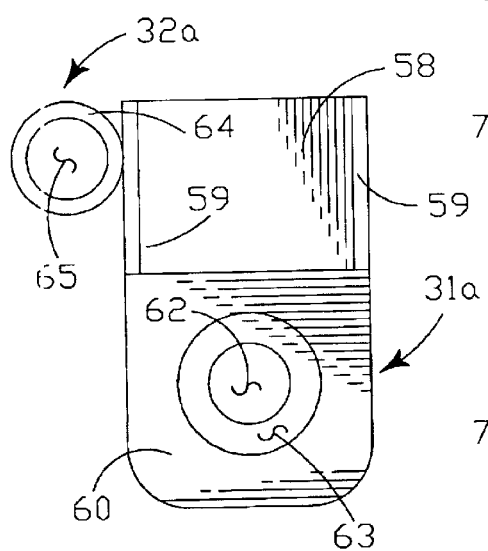
FIG. 17
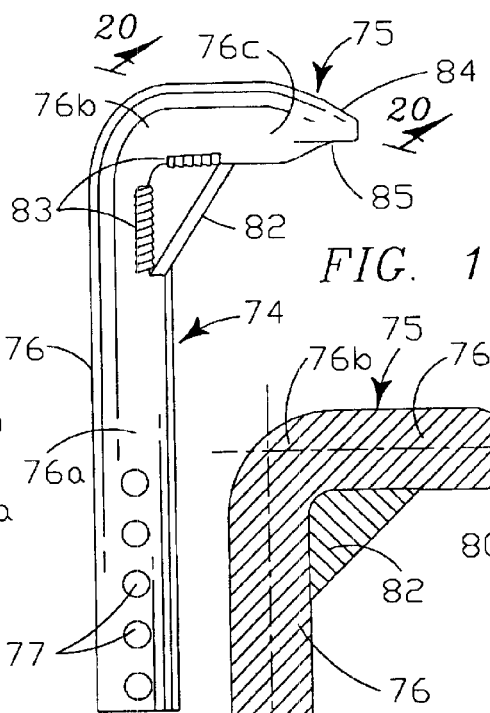
FIG. 18
FIG. 19
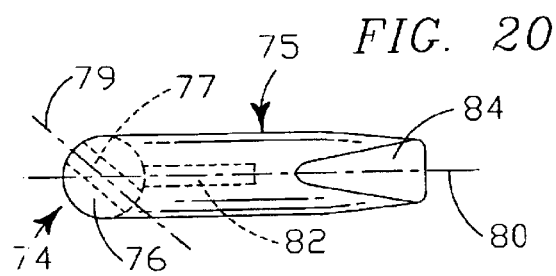
FIG. 20

SAFETY FASTENER FOR BALL AND SOCKET HITCH

II. BACKGROUND OF INVENTION

IIA. RELATED APPLICATIONS

There are no applications related hereto heretofore filed in this or in any foreign country.

IIB. Field of Invention

My invention relates generally to land vehicles and more particularly to a safety type fastener for a ball and socket type hitch coupling a first propelling vehicle and a second towed vehicle.

IIC. Background and Description of Prior Art

When a first automotive type vehicle tows a second automotive type vehicle, especially such as a non-powered trailer, a hitch interconnecting the vehicles for effective operation must allow motion of each vehicle relative to the other in three mutually perpendicular planes while yet providing a strong, secure and safe interconnection. A common and popular hitch that accomplishes these ends is the so-called "ball and socket" hitch that provides a spherical ball carried by a depending bolt for fastening on a rigid hitch bar carried by a first vehicle, commonly the towing vehicle, and a hitch structure, defining a hemispherical chamber to pivotally receive the ball, carried by a rigid hitch bar structurally interconnected to the towed vehicle. The hitch structure commonly provides a fastening arm that communicates with the associated ball at some portion of the hemispherical surface thereof that is not covered by the hemispherical chamber of the hitch to prevent the hitch from becoming accidentally disengaged from the ball.

This type of ball and socket hitch is simple of use, readily available, popular and widely used, especially with trailers of lower and medial gross weight. Notwithstanding its popularity, however, the ball and socket hitch is not completely reliable or safe in use as often the forces encountered in normal vehicle usage disengage the socket from the ball by disabling the fastening structure either by permanent or temporary reconfiguration. This problem has been recognized and dealt with in the past, most commonly by providing a secondary safety connection such as a chain between the propelling vehicle and towed vehicle to maintain interconnection of the vehicles. This solution, though operative, is not completely satisfactory because the interconnection of the two vehicles is more loose with a chain interconnection which prevents proper towing and steerage of the towed vehicle to make continued towing, especially on roadways, quite dangerous.

This problem has heretofore been recognized and responsively various auxiliary safety devices have become known to operatively maintain the hitch socket on the associated ball. These known safety devices have generally been designed for, and are only effectively operative on hitches for lighter towed vehicles. In the modern day, however, the trend in both propelling vehicles and towed vehicles has been toward heavier vehicles and a need has risen to provide a safety fastener for heavier vehicles that still allows use of a ball and socket type hitch. The instant invention seeks to provide such a safety fastener to fulfill this need.

The instant safety fastener provides a body defining a channel that completely surrounds a hitch beam on which it is carried, with the bolt carrying the hitch ball extending through the body and the hitch beam carried therein to rigidly and securely fasten the body on the hitch beam in an easily removable fashion. Most prior safety fasteners for lighter ball and socket hitches have not provided nor required such secure fastening of the safety fastener on the vehicle hitch bar.

Safety hitches that provide some structural element above the socket element of a ball and socket hitch to maintain interconnection of the socket hitch on the ball member have generally supported the structural element in a cantilever fashion, probably largely to prevent interference with motion of the socket element on the ball while yet allowing relatively free pivotal motion of either element relative to the other in three mutually perpendicular planes. The instant safety device in a first primary species provides two spacedly adjacent vertical arms carried in collars structurally supported by the hitch body for adjustable vertical motion with a horizontal fastening beam extending between the upper end portions of the vertical arms to provide a beam type element to restrain upward motion of the socket member of the hitch in a non-cantilevered fashion which provides substantial strength and rigidity. Subsequent experimentation allowed development of a second species of safety fastener having a single L-shaped fastening arm with a vertical leg carried in a collar structurally supported by the safety fastener body for vertical adjustment and a perpendicular horizontal fastening arm extending over the socket member. A particular disclosed construction for this second species of safety device develops approximately seventy-five percent of the strength of the beam type fastener of the first species and is somewhat more simple of construction and use.

Though most ball and socket hitches for automotive vehicles have developed somewhat of a standardized configuration, there still are configurational variances between the hitches of various manufacturers. To accommodate these differences and allow use of the instant safety fastener on a substantial number of ball and socket hitches, it is necessary to make provision for adjustable vertical positioning of the horizontal fastening arm of the safety fastener relative to its base. The instant safety fastener meets this requirement by providing collars structurally supported by the fastener body for each vertical fastening arm so that the vertical fastening arms of either species of fastener may slidably move within the collars for adjustable vertical positioning. A plurality of spaced vertical holes are defined in at least one of each collar or vertical arm body with at least one hole in the other element to allow a fastening pin to extend through a cooperating set of such opposed holes in both associated elements to releasably maintain adjustable vertical positioning of each vertical arm relative to the vertical arm collar carrying it. If desired, the vertical arm fastening pin may be of a headed type with a lock structure at the end distant from the head to allow locking of the pin in a cooperating set of adjustment holes to prevent unintentional removal of the socket element of a hitch from an associated ball and thusly prevent removal of a trailer from a propelling vehicle. Various prior safety fasteners have provided some means of adjusting the vertical position of a fastening arm relative to the hitch being fastened, but in general such prior fasteners have not used a pin and spaced hole type adjusting system with a key type lock to prevent unauthorized removal of the hitch elements from each other.

My invention resides not in any one of these features individually, but rather in the synergistic combination of all of its structures which necessarily give rise to the functions flowing therefrom.

III. SUMMARY OF INVENTION

The instant safety fastener for ball and socket hitches provides a base defining a channel of rectilinear cross-section to receive and fit about the hitch beam of a vehicle with vertically oriented holes defined in the body to cooperatively receive the fastening bolt of the hitch ball for releasable fastening of the hitch ball and the body of the hitch tongue. The base carries two laterally spaced vertically oriented arm collars each defining vertical channels to receive slidably vertical fastening arms of a fastener structure for adjustable positioning therein. Each collar defines at least one set of diametrically extending pin holes and each vertical fastening arm defines a plurality of axially spaced diametrically extending fastening holes to cooperatively receive fastening pins extending through selected paired sets of pin holes in each collar and the fastening arm carried therein for vertically adjustable fastening of the fastening arms in the carrying collars. The vertical fastening arms structurally carry a horizontal fastening beam, extending between their upper portion, for positioning over a portion of the hitch carried by the associated ball to prevent removal of the hitch from the ball. The fastening pins may be headed and carry a fastening device to prevent accidental removal of the pins from the collar carrying them and this fastening device optionally may be a lock type to prevent unauthorized removal of socket element from the ball of a hitch.

A second species of the safety fastener provides a body with only a single vertical arm collar adjustably carrying an L-shaped vertical arm for adjustable vertical fastening in the collar. A horizontal fastening arm extends from the lower portion of the vertical arm with a fillet extending between the inner part of the lower surface of the horizontal fastening arm to the adjacent surface of the upper portion of the vertical arm.

In creating such a device it is:

A principle object to provide a safety fastener for ball and socket type hitches interconnecting vehicles of medial to heavy gross weights.

A further object is to provide such a safety fastener that has adjustable features that allow use with various ball and socket hitches of present day commerce without reconfiguration of the safety fastener, ball and socket hitches or existing tongue beams of propelling or propelled vehicles.

A further object is to provide such a safety fastener that has a base carried by hitch beam of a propelling vehicle which in turn carries a vertically adjustable fastening beam extendable over the socket element of the hitch so that the fastening beam may be locked in place over the socket element of the hitch to prevent accidental or unauthorized removal, of the socket element from the associated ball.

A still further object is to provide such a safety fastener that is of new and novel design, of rugged and durable nature, of simple and economic manufacture and one otherwise well suited to the uses and purposes for which it is intended.

Other and further objects of my invention will appear from the following specification and accompanying drawings which, form a part hereof. In carrying out the objects of my invention, however, it is to be understood that its essential features are susceptible of change in design and structural arrangement with only preferred practical embodiments of the best known modes being illustrated and specified as is required.

IV. BRIEF DESCRIPTIONS OF DRAWINGS

In the accompanying drawings which form a part hereof and wherein like numbers of reference refer to similar parts throughout:

FIG. 1 is an isometric view of the outer end portion of a typical outer end portion of a hitch bar structure of a propelling vehicle carrying a ball and socket type hitch with a portion of the outer surface of the socket member shown on the ball.

FIG. 2 is a vertical elongate cross-sectional view in operative position hitch structure such as that of FIG. 1, taken on the line 2—2 through in the direction indicated by the arrows, to show the structure and operation of a typical ball and socket hitch.

FIG. 5 is an isometric view of the base member of the first species of the safety fastener of FIGS. 3 and 4.

FIG. 6 is an orthographic top plan view of the base member of FIG. 5.

FIG. 7 is an orthographic front view of the base member of FIG. 5.

FIG. 8 is a broken vertical cross-sectional view of the base member of FIG. 5 taken on the lines 8—8 thereon in the direction indicated by the arrows.

FIG. 15 is an isometric view of the base member of the safety fastener of FIG. 14.

FIG. 16 is an orthographic forward elevational view of the base member of FIG. 15.

FIG. 17 is an orthographic top plan view of the base member of FIG. 15.

FIG. 18 is an isometric view of the fastening arm member of the safety fastener of FIG. 14.

FIG. 19 is a vertical cross-sectional view through the horizontal fastening member of FIG. 18, taken on the line 19—19 thereon in the direction indicated by the arrows.

FIG. 20 is a horizontal cross-sectional view through of the fastening beam of the fastening member of FIG. 18, taken on the line 20—20 on FIG. 19 in the direction indicated by the arrows thereon.

FIG. 21 is an isolated enlarged expanded isometric view of the lockable pin structure shown in of FIGS. 13 and 14.

V. DESCRIPTION OF THE PREFERRED EMBODIMENT

Figure 3:
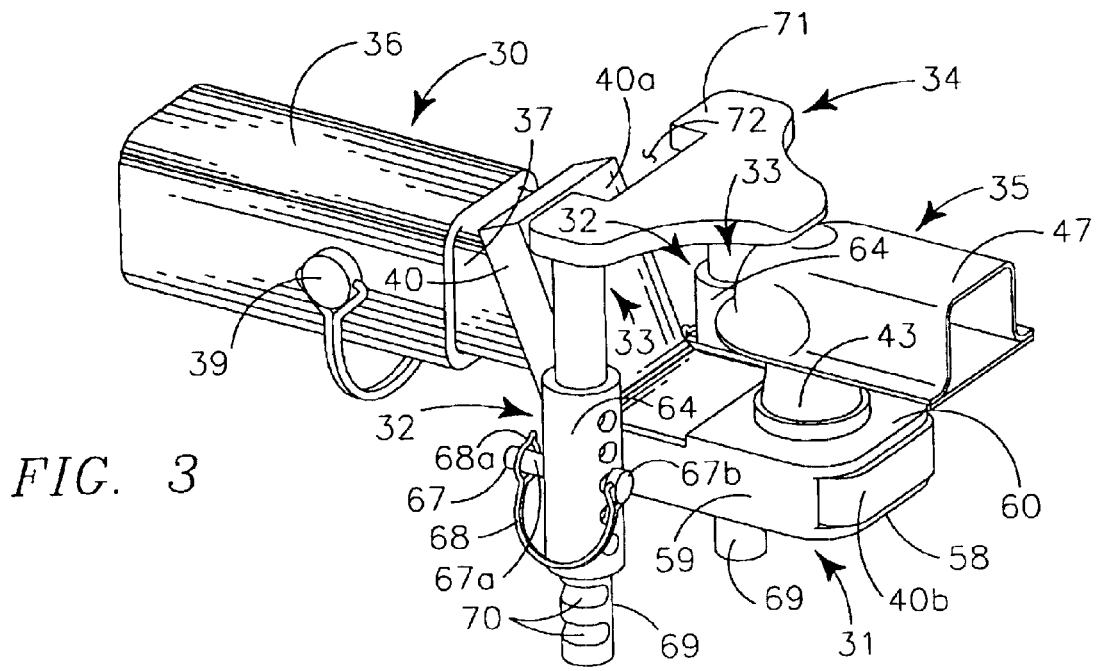
FIG. 3 is an isometric view of the first species of my safety fastener in operative position on a ball and socket type hitch such as of FIGS. 1 and 2.

A typical vehicular hitch structure 30 for ball and socket hitch 35 with which my safety fastener is operative is illustrated in FIGS. 1–3. The frame of a pulling vehicle (not shown) supports a rearwardly extending square box beam 36 configured to slidably carry square hitch beam 37 in its internal channel. The beams 36,37 each define cooperating pairs of fastener holes 38 extending horizontally through the opposed vertical sides of each beam 36,37 to receive pin type fastener 39 therethrough to releasably interconnect hitch beam 37 within the channel of box beam 36. The rearward end portion of hitch beam 37 structurally carries hitch tongue 40 having forward angulated portion 40a and rearwardly horizontal extending portion 40b. The medial portion of the hitch tongue 40 defines ball fastening hole 41 extending vertically therethrough to receive the fastening bolt of a ball member of a ball and socket hitch. This type of hitch beam 40 allows 180° rotation for placement in the channel of box beam 36 so that the horizontal portion 40b of the hitch tongue may be selectively positioned at a higher or lower position relative to box beam 36.

The ball and socket hitch structure 35 provides a ball member having spherical ball 42 supported on base 43 so that more than half of the spherical surface of ball 42 is exposed. Fastening bolt 44 depends from base 43 to define a lower threaded portion which carries nut 45. For use the fastening bolt 44 is inserted through fastening hole 41 defined in hitch tongue 40, as illustrated in FIG. 2, and nut 45 is placed thereon to fasten the ball member in the hitch tongue 40, commonly with one or more cylindrical washers 46 extending between the upper surface of nut 45 and lower surface of hitch tongue 40 to allow accommodation of hitch tongues of different thicknesses.

The hitch member of ball and socket hitch 35 provides U-shaped hitch beam 47 having a spherical forward end portion 47a to fit upon the upper portion of the spherical surface of ball 42. The hitch beam 47 extends spacedly rearwardly from the ball member for structural support on the tongue beam of a trailer or other vehicle to be towed (not shown).

Medial channel 48 defined by hitch beam 47 carries a fastening structure to releasably maintain hitch beam 47 in movable interconnection with spherical ball 42. This fastening structure commonly provides over center lever 49 carried for pivotal motion by bracket 50. The over center lever 49 pivotally carries depending fastener link 51 and release lever 52, which may be pivoted into and out of connection with fastening link 51. Fastening arm 53 has depending forward portion 53a configured to communicate with ball 42, horizontal arm 53b extending spacedly rearwardly beyond fastener link 51 which is carried in a hole defined in horizontal arm 53b and mounting bracket 53c which extends upwardly from arm 53b to receive pin 54 which pivotally mounts the fastening arm 53b on the hitch beam 47. The lower portion of fastener link 51 defines a threaded portion to receive nut 55 supporting cup type washer 56 on its upper surface to support cylindrical extension spring 57 extending between the upper surface of washer 56 and the lower surface of fastening arm 53 to bias the fastening arm upwardly.

With this mechanism when over center lever 49 in the forwardly extending horizontal down position illustrated in FIG. 2, fastening arm 53 will be in the position illustrated in FIG. 2 with depending fastening portion 53a immediately adjacent ball 42 to fasten the hitch member on the ball member. When the over center lever 49 is pivoted upwardly and rearwardly the fastening arm 53 will be moved downwardly to release depending forward portion 53a from its fastening position adjacent ball 42 to allow removal of the hitch beam 47 from the ball 42.

Though the foregoing illustrated and described fastening mechanism is common to various presently commercially available ball and socket hitches, the description of this particular fastening mechanism is not intended to be limiting, but rather is intended only to describe background to show the use environment of my safety fastener. The use of my safety fastener on other compatible ball and socket type hitches having other fastening mechanism is within the spirit and scope of the instant invention.

Figure 4:
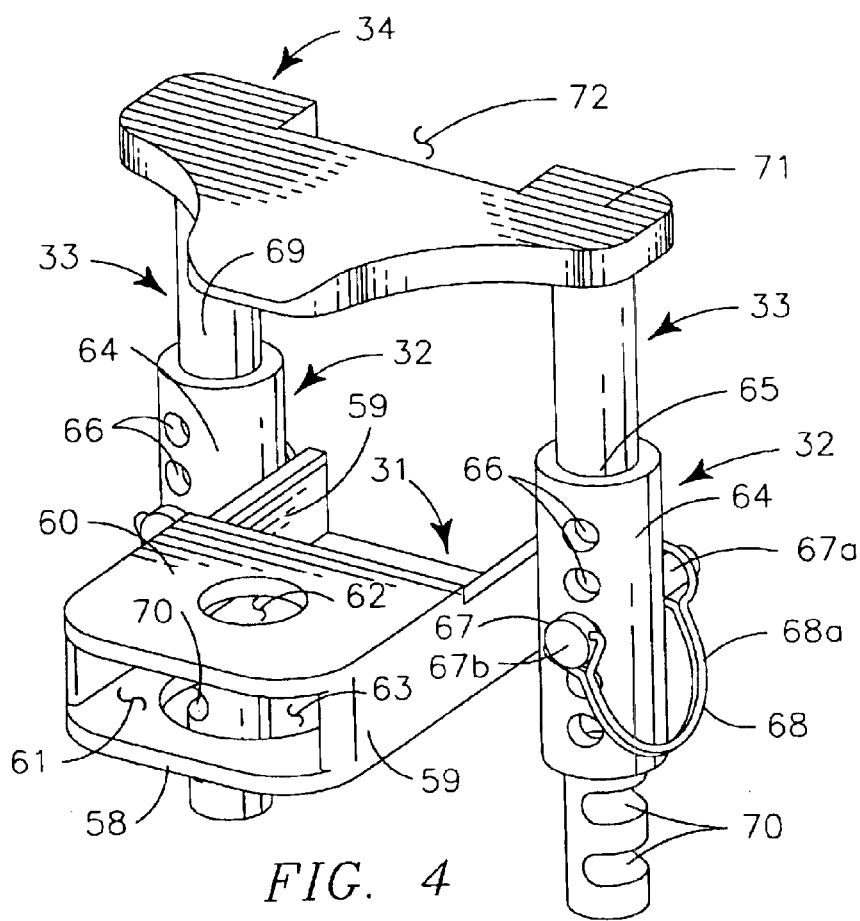
FIG. 4 is an isometric view of the safety fastener of FIG. 3 isolated from the ball and socket hitch to better show its parts, their configuration and relationship.
Figure 9:
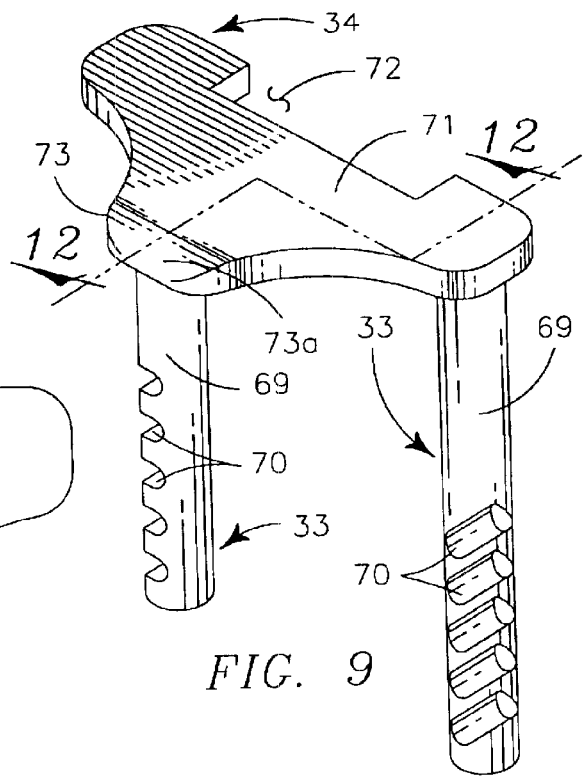
FIG. 9 is an isometric view of the fastening beam member of the first species of the safety fastener of FIGS. 3 and 4.
Figure 10:
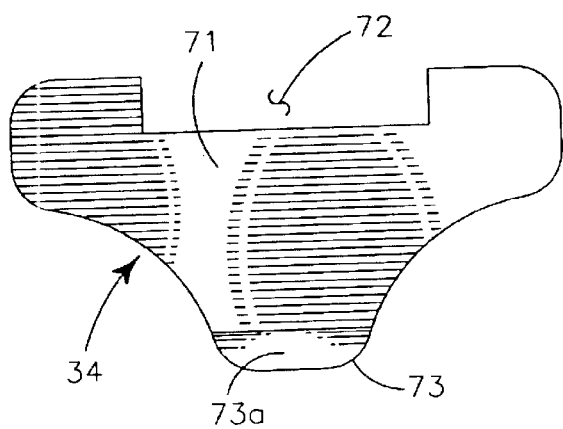
FIG. 10 is an orthographic top plan view of the fastening beam member of FIG. 4.
Figure 12:
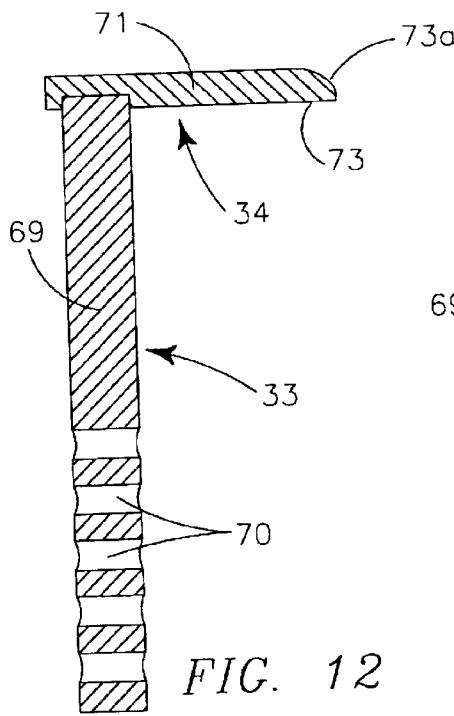
FIG. 12 is a broken vertical cross-sectional view through the fastening beam member of FIG. 9, taken on the line 12—12 thereon in the direction indicated by the arrows.
Figure 11:
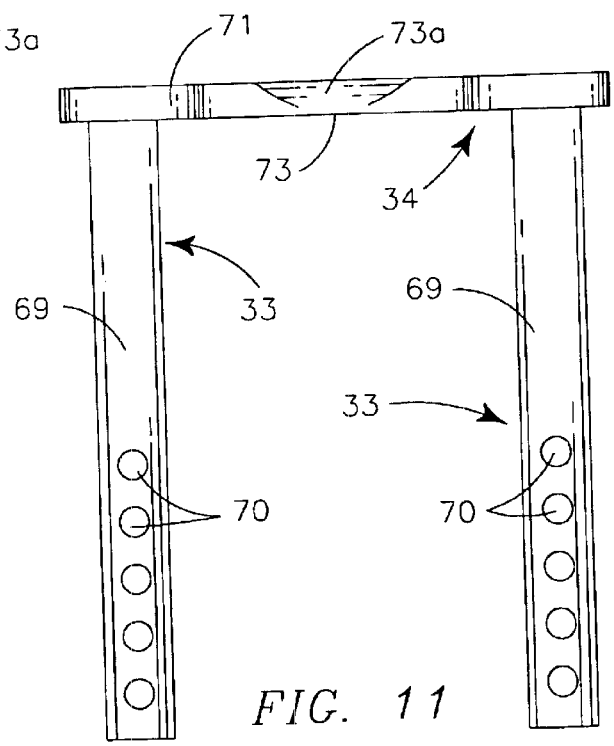
FIG. 11 is an orthographic front elevational view of the fastening beam member of FIG. 9.

The first species of my safety fastener, as seen in FIGS. 3 and 4, provides base 31 carrying vertical fastener arm collars 32 to receive vertical fastener arms 33 carrying horizontal fastening beam 34.

Base 31 is somewhat of a four sided peripherally defined box without ends formed by bottom 58 interconnecting upstanding similar sides 59 which in turn interconnect top 60 extending therebetween, all to define medial channel 61. The dimensioning of the base elements 58,59,60 is such as to define the medial channel 61 over and about to fit the rearward portion 40b of hitch tongue 40 slidable motion, as illustrated in FIG. 3. The bottom 58 is somewhat longer in a forward direction than top 60 to allow use of the safety fastener on hitch tongues 40 having rearward horizontal portions of 40b of varying lengths so as not to interfere with forward angulated portion 40a of the hitch tongue. The medial portion of top 60 defines hole 62 to receive fastening bolt 44 of ball 42 therethrough. In bottom 58 defines somewhat larger hole 63, axially aligned with hole 62, to receive the fastening bolt 44 therethrough. Both holes 62,63 are laterally positioned so that they will be co-axial with hole 41 defined in hitch tongue 40 when the hitch tongue is positioned within channel 61 defined by the base 31. Commonly in substantially all vehicular hitch structures 30 the hole axes are positioned along a medial line.

Vertical arm collars 32 are tubular elements formed with a circular cylindrical bodies 64 defining medial channel 65, as seen in FIGS. 4 and 8. Each cylindrical body 64 defines a plurality of vertically spaced diametrically opposed fastener holes 66. Each collar body 64 is structurally carried in its axially medial portion on the outer surface of body sides 59 near the forward end portions of the sides 59. Each vertical arm collar 32 carries a fastening pin 67 extending through a cooperating pair of holes 66. In the instance illustrated, fastening pin 67 provides cylindrical body 67a with head 67b at one end and acuate resiliently deformable fastener 68 extending from pivotal interconnection with head 67b with looped end portion 68a fastenable over the opposite end of pin body 67a as illustrated for maintenance of the pin 67 within the fastening holes 66 carrying it.

Vertical arms 33 of the fastening structure, seen in detail in FIGS. 9–12, are similar elongate circularly cylindrical rods 69 of a diametrical size to slidably fit within channels 65 of vertical collars 32. The lower portions of each rod 69 define a plurality of axially spaced holes or slots 70 to receive the body 67a of a fastening pin 67 therein and allow that fastening pin to pass through a set of the paired opposed fastening holes 66 to positionally maintain the vertical arms 33 in a selected vertical position in vertical arm collars 32.

Horizontal fastening beam 34 provides planar body 71 extending between and structurally carried by the upper end portions of vertical arm rods 69. The body 71 is somewhat elongate with a major extending laterally. The forward facing edge of the body 71 defines rectilinear notch 72 to allow the body 71 to be positioned lower or nearer to base 31 without being interfered with by the forward adjacently lower angulated portion 40a of hitch tongue 40. The forward portion of body 71 defines forwardly extending fastening protuberance 73 to extend forwardly to a position over forward portion 47a of hitch beam 47 and preferably has downwardly and forwardly sloping upper surface 73a. The protuberance 73 prevents upward motion of hitch beam 47 away from ball 42, without interfering with socket member fastening structure 49,50,52 or preventing horizontal turning motion of the hitch beam.

A second species of safety fastener providing only a single vertical arm for support of a fastening beam is illustrated in FIGS. 13–20 where it is seen to provide base 31a for fastening on vehicle hitch structure 30 that is the same as the base 31 that was provided by the first species of safety fastener having two spaced vertical arms 33 and the base 31a of the second species operates in the same fashion for attachment on the hitch structure 30 to be serviced.

The second species of safety fastener provides a single vertical arm collar 32a that is the same as one of the two vertical arm collars 32 of the first species of safety fastener. The vertical arm collar 32a may be fastened on either similar side 59 of base 31a by welding in the same fashion as the vertical arm collar 32 would have been fastened in the first species of the safety fastener.

The second species of safety fastener provides a different vertical arm 74 and horizontal fastening beam 75 that in the instance illustrated are unitarily formed from a unitary body rod 76. The vertical arm 74 of the body rod 76 provides a circularly cylindrical cross-section sized to slidably fit within channel 65 defined by body 64. Vertical arm 74 defines a plurality of diametrically extending vertically spaced fastening pin holes 77. These holes 77, if desired for convenience of manufacture, may be formed as semi-circular slots extending from the medial axially aligned hole position radially outwardly through a semi-circular portion of vertical arm 74, such as was illustrated in FIGS. 3–4. The fastening pin holes 77 are substantially of the same diametrical size as the fastening pin holes 66 defined in vertical arm collar 32a to slidably receive fastening pin 78 (FIGS. 13,14) extending through an aligned set of the fastening pin holes 66,77.

This angulation allows the axis of holes 66 in vertical arm collars 32a to be parallel to sides 59 of body 31a while yet allowing horizontal fastening beam 75 to angulate with plane 79 through the axes of holes 77 extending toward base 31a to assure contact of the outer end portion of horizontal fastening beam 75 with the upper surface of forward portion 47a of the socket member of ball and socket hitch 35.

The upper part of vertical portion 76a of body rod 76 forms bend 76b to provide horizontal fastening beam 75 formed by horizontal portion 76c of the body rod 76 such that the axis 80 of the fastening beam 75 is substantially perpendicular to the axis 81 of vertical portion 76a, as seen in FIG. 19.

Preferably when fastening pin holes 77 are created a plane 79 through the axes of the holes will be angulated at an acute angle of about 20° to 30° to the axis 80 of the horizontal portion 76c of body rod 76, as illustrated in FIG. 20.

The adjacent inner surfaces of body rod bend 76b are reinforced by triangular-like fillet plate 82 which is structurally fastened to the adjacent surfaces of body rod 76 by welding 83. The size of this fillet plate 82 cannot be sufficient to interfere with the extension of horizontal portion 76c of the body over the upper forward spherical portion 47a of hitch beam 47 which usually limits the fillet plate 82 to an extension along the lower surface of horizontal portion 76c of not more than approximately one-third the length of the horizontal portion 76c, substantially as illustrated.

The axial length of vertical portion 76a of body rod 76 must be such as to allow positioning of the lower surface the horizontal portion 76c of the body rod at a level vertically co-planar with the upper surface of forward spherical portion 47a of hitch beam 47 when the vertical portion 76a is in a fastenable position within body 64 of vertical arm collar 32a. Similarly the axial length of horizontal portion 76c of the body rod must be sufficient to extend to a fastenable position over the top of forward spherical portion 47a of hitch beam 47.

Preferably the upper outer surface of horizontal portion 76c of body rod 76 is removed to form an outward and downwardly tapering surface 84 to aid in preventing any interference of the horizontal portion 76c of the body with the fastening mechanism of hitch beam 47. Preferably the lower outer end part of horizontal portion 76c of body 76 is removed in an upward and forwardly extending fashion to provide surface 85 as illustrated in FIG. 19, to provide a better fit on the upper surface of the forward spherical portion 47a of the hitch beam 47. Neither of the aforesaid configurations of the outer end part of horizontal portion 76c of the body rod 76 are necessary, however, and the mechanism is operable without them.

Figure 13:
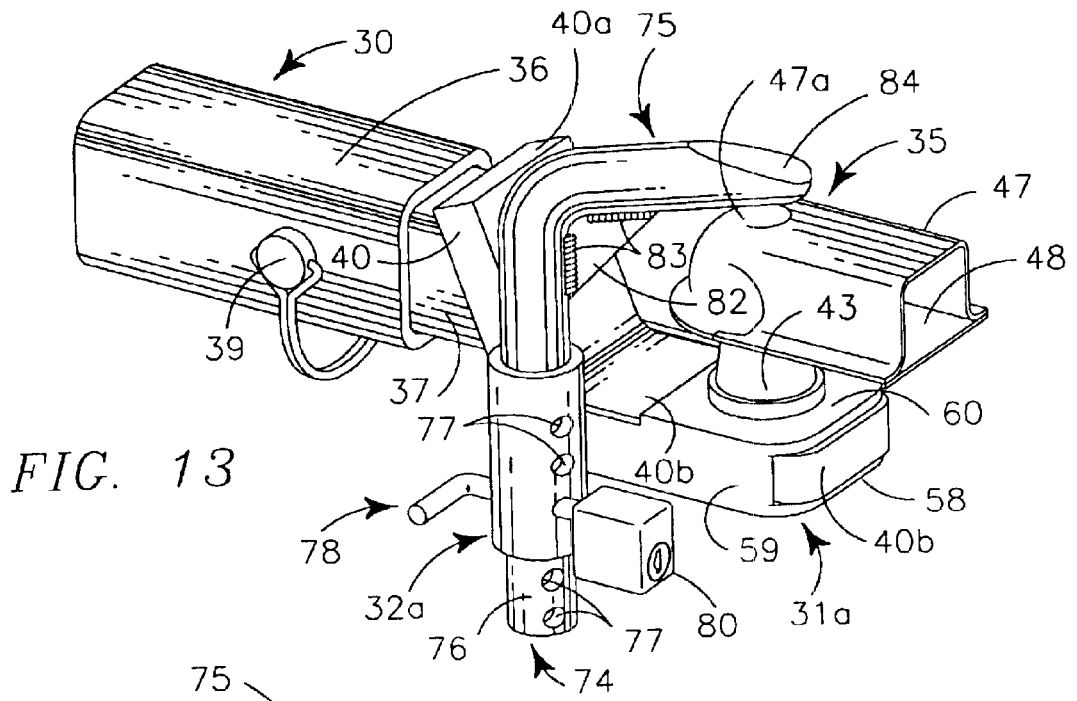
FIG. 13 is an isometric view of the second single arm species of safety fastener in operative position on a ball and socket type hitch as illustrated in FIGS. 1 and 2.
Figure 14:
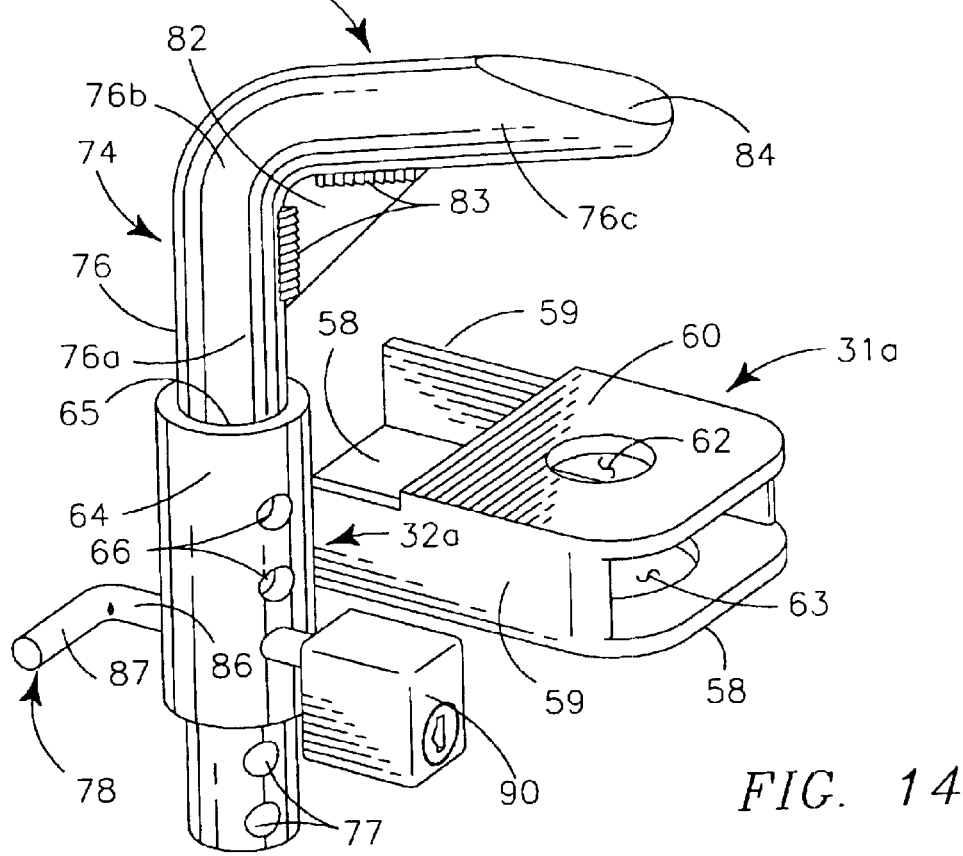
FIG. 14 is an isometric view of the second species of the safety fastener of FIG. 13 isolated from ball and socket hitch shown in FIG. 13 to show its parts, their configuration and relationship in more detail.

Fastening pin 78, illustrated in FIGS. 13, 14 and 21, is somewhat different from fastening pin 67 illustrated and described with the first species of safety fastener. The fastening pin 78 is an L-shaped pin having longer cylindrical body 86 with substantially perpendicularly extending fastening arm 87 at a first end. The diameter of body 86 is such as to slidably fit within fastening hole 66 of vertical arm collars 32a and cooperating fastening pin holes 77 defined in vertical portions 76a of body rod 76. The second outer end portion of body 86 defines truncated conic point 88 with fastening groove 89 defined spacedly axially inwardly from the conic point 86. The second fastening end portion 88,89 of fastening pin 78 is adapted to be received in lock box 100. The axial length of body 86 is somewhat greater than the distance between the inner surface of lock box 100 and the adjacent surface of fastening arm 87 to allow the fastening pin 78 to extend through a cooperating pair of fastening holes 66 in vertical arm collar 32a and be fastened therein with lock box 100 one side of the vertical arm collar 32a and fastening arm 87 on the outer side of that collar 32a. The lock box 100 illustrated is one having a cylindrical key-operated lock with a locking lug (not shown) adapted to fit within fastening groove 89. This type of lock box 100 is well known, commercially available in the modern day marketplace and therefore not described in detail.

Having described my invention its use may be understood.

The operation of either first or second species of my invention is substantially the same. A safety hitch of either species is created according to the foregoing specification and drawings with either a single vertical arm collar 32a on one side 59 of base 31a or two vertical arm collars 32 in laterally opposed orientation on the outer forward sides 59 of the base 31.

The body 31 or 31a then is attached to hitch tongue 40 of ball and socket hitch 35 by removing nut 45 from fastening bolt 44 and removing the ball element from the hitch tongue 40. Body 31 or 31a is then placed about the hitch tongue with that tongue extending through channel 61 so that hole 41 in the hitch tongue 40 is aligned with hole 62,63 in the rearward portion of base 31 or 31a. The ball element then is re-established by placing its fastening bolt 44 through holes 62,41,63 and re-establishing nut 45 in the lower end portion of the bolt.

The socket member of ball and socket hitch 35 is then fastenably established on the ball portion of that hitch 35 in the fashion as heretofore known for the particular ball and socket hitch elements being serviced.

The vertical arm or arms 74,32 are then established in channels 65 of vertical arm collars 32a,32, as the case may be, and are vertically positioned so that horizontal fastening beams 34,75 are immediately above the upper surface of the forward spherical portion 47a of hitch beam 47 of ball and socket hitch 35. When the vertical arms 74 or 32 are in this position, either fastening pin 67 or 78, as the case may be, are inserted through an opposed pair of fastening holes 66 defined in vertical arm fastening collars 32 or 32a, and the axially aligned fastening holes 70,77 defined in the vertical arms 33 or 33a which fasten the horizontal fastening beam 34 or 75 in as near as possible to the desired fastening position. Fastening pin 67 or 78 is then fastened for positional maintenance of the vertical arms 33 or 33a in collars 32 or 32a as hereinbefore specified, and the safety fastener is then installed and ready for use.

In using either safety fastener as described, it is to be noted that horizontal fastening beams 34 or 34a will be immediately above the socket member of ball and socket hitch 35 and that the horizontal fastening beams cannot move upwardly by reason of their ultimate support on hitch tongue 40 which carries the ball element of the ball and socket hitch 35, so that the hitch element may not move upwardly sufficiently to become disengaged from the ball element, without breakage of either the ball and hitch structure or the safety fastener structure.

It is further to be noted that the second single vertical arm safety fastener in the form specified has approximately 75% of the strength of the first species having two spacedly related vertical arms when formed with comparable elements of the same size and strength, while the first species of safety fastener is somewhat more simple of use and cheaper of manufacture. The first species of the safety fastener having two vertical arms serves well for use with heavy trailer vehicles while the second species serves better with medium trailer is structures.

The foregoing description of my invention is necessarily of a detailed nature so a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent and

What I claim is:

1. A safety fastener for ball and socket hitches having a ball member with a spherical ball carried by a depending fastening bolt fastened on the tongue of a hitch beam of a towing vehicle, and a socket member having a hitch beam with a forward spherical portion movably carried over the spherical ball and operatively connected to a towed vehicle, comprising in combination:

A base defining an elongate channel therethrough to receive the tongue of a towing vehicle hitch structure, said base defining cooperating holes extending vertically therethrough to receive the fastening bolt of the ball member to fasten the base about the hitch beam below the spherical ball;

at least one vertical arm collar defining a vertical channel therethrough carried by the forward portion of at least one side of the base and defining a plurality of fastening holes extending diametrically therethrough to releasably receive a fastening pin therethrough;

at least one elongate vertical arm slidably carried in the channel defined by the at least one vertical arm collar, said vertical arm defining a plurality of axially spaced fastening pin holes extending therethrough to cooperate with the fastening pin holes defined in the vertical arm collars to receive fastening pins therethrough to maintain the at least one vertical arm in vertically adjustable positions in the at least one vertical arm collar; and A horizontal fastening beam carried by the upper portion of the at least one vertical arm to extend spacedly therefrom for vertical positioning above the forward spherical portion of the hitch beam to maintain the hitch beam in interconnection with the associated ball element.

2. The safety fastener of claim 1 having two laterally spaced vertical arm collars each carrying a vertical arm for adjustable vertical positioning in the associated vertical arm collar and the horizontal fastening beam defining a flat planar element extending between the upper portions of the two vertical arms and defining a rearward notch and a forward fastening protuberance to aid fastenable positioning of the fastening protuberance over the forward spherical portion of the fastening beam.

3. The safety fastener of claim 1 having one vertical arm collar carrying one vertical arm, wherein the vertical arm and horizontal fastening beam comprises unitary L-shaped structure having a longer vertical arm and a shorter perpendicular horizontal fastening beam extending rearwardly from the upper portion thereof at an acute included angle of from ten to forty degrees to a vertical plane through the axes of fastening holes defined in the vertical arm.

\* \* \* \* \*